United States Patent [19]

Kawaguchi

[11] 4,142,764
[45] Mar. 6, 1979

[54] HYDRAULIC PRESSURE CONTROL VALVE FOR USE IN A HYDRAULIC BRAKE SYSTEM

[75] Inventor: Hiroshi Kawaguchi, Mishima, Japan

[73] Assignee: Toyota Jidosha Kogyo Kabushiki Kaisha, Japan

[21] Appl. No.: 875,158

[22] Filed: Feb. 6, 1978

[30] Foreign Application Priority Data

Feb. 14, 1977 [JP] Japan .................... 52-15683[U]

[51] Int. Cl.² ............................................. B60T 8/18
[52] U.S. Cl. .................................. 303/6 R; 303/22 R
[58] Field of Search ............. 303/6 R, 22 R; 188/195, 188/349

[56] References Cited

U.S. PATENT DOCUMENTS 3,840,280  10/1974  Watanabe ..................... 303/22 R

*Primary Examiner*—Trygve M. Blix
*Assistant Examiner*—Reinhard J. Eisenzopf
*Attorney, Agent, or Firm*—Kane, Dalsimer, Kane, Sullivan and Kurucz

[57] ABSTRACT

A hydraulic pressure control valve used in a hydraulic brake system for providing a controlled hydraulic pressure thereto, wherein there are provided an hydraulic pressure relieving mechanism and a bypass mechanism adapted to release or cancel the function of a hydraulic pressure relieving mechanism. The bypass mechanism comprises a bypass route defined in a cylindrical bore defined in a casing, and a piston fitted in the cylindrical bore and adapted to open and close the bypass route and a spring to bias the piston toward a position to close the bypass route. One end of the piston is open to the atmospheric pressure, and the opposite end thereof is exerted a hydraulic pressure working thereon to bias it toward the open position of the bypass route. When a hydraulic pressure working upon the opposite end of the piston is caused to be increased to a high level enough to overcome the biasing force of the spring, the piston is actuated to move toward the position to open the bypass route, thereby releasing or cancelling the hydraulic pressure relieving function of the relieving mechanism.

7 Claims, 4 Drawing Figures

HYDRAULIC PRESSURE CONTROL VALVE FOR USE IN A HYDRAULIC BRAKE SYSTEM

BACKGROUND OF THE INVENTION

1. Field of the Invention

The present invention relates to a hydraulic pressure control valve for use in a hydraulic brake system of a vehicle.

2. Description of the Prior Art

In a vehicle's hydraulic brake system, a tandem master-cylinder is used as a master cylinder, and in this type of master cylinder, the hydraulic system is separated to two independent hydraulic lines, one being for the front hydraulic line for the front wheels, the other for the rear hydraulic line for the rear wheels. In the arrangement of the hydraulic brake system having such two independent hydraulic lines therein, there is provided a hydraulic pressure control valve adapted to effect the pressure relieving function on the rear hydraulic line, in order to provide a stable braking operation when a vehicle is braked, in coping with a trend of gravity center's movement toward the running direction of a vehicle due to the inertia thereof.

As one typical example of this type hydraulic pressure control valve for use in a vehicle's hydraulic brake system, there is generally known a load-responsive type valve. This load-responsive type valve comprises an inlet port connected to the master cylinder, a pressure relieving mechanism adapted to effect a pressure relieving function on the oil pressure from the master cylinder at a constant rate depending upon the load of a vehicle, and an outlet port connected to the slave or wheel brake cylinders in the rear hyraulic line and adapted to direct thus relieved hydraulic pressure thereto. According to the conventional load-responsive valve, the operating pressure of the hydraulic oil served in the rear hydraulic line is caused to be relieved or reduced depending upon the load of a vehicle, thereby aiming to assure a stable braking performance.

However, should there be any damage such as an accidental leakage in the front hydraulic line, it is inevitable that the braking effect from the hydraulic brake system of a vehicle has to depend only on the rear hydraulic line. In such an occasion, it is not preferred that the pressure relieving mechanism operates.

In order to cope with such problem, there have been proposed various bypass mechanisms for the purpose of releasing or cancelling the function of such pressure-relieving mechanism as stated above, such bypass arrangement would obviously add the complexity of the conventional load-responsive valve systems when incorporated as a unit therein. As the load-responsive valve is usually arranged on the rear axle side, an extensive hydraulic piping is required which leads the hydraulic oil in the front hydraulic line to the bypass mechanism of the load-responsive valve for the bypass mechanism.

SUMMARY OF THE INVENTION

In this respect, it is a primary object of the present invention to provide an improved hydraulic pressure control valve for use in a hydraulic brake system of a vehicle wherein it does not require any operative connection with the front hydraulic line, and therefore, it can be simple in its construction, and wherein there are both a pressure relieving mechanism and a bypass mechanism incorporated therein.

According to the present invention, there is provided a hydraulic pressure control valve which comprises a pressure relieving mechanism adapted to operatively direct, under a relieved pressure, a hydraulic pressure from an inlet port connected to a master cylinder into an outlet port connected operatively to each of slave or wheel brake cylinders, and a bypass mechanism related to the pressure relieving mechanism, the bypass mechanism having a cylinder portion extending across and connecting operatively the both inlet and outlet ports, a piston slidably fitted within the cylinder portion having one end open to the atmospheric pressure and the other end receiving the hydraulic pressure from the inlet port, and biasing means adapted to urge the piston toward the inlet port.

With such arrangement of the hydraulic pressure control valve having a built-in feature to operatively release a hydraulic pressure relieving function thereof according to this invention for use in a hydraulic brake system of a vehicle, there is advantageously provided an effect of releasing or cancelling operatively the hydraulic pressure relieving function in the following manner. This is, when the piston is held in its closing position on the inlet port side within the cylinder portion under the urging force of the biasing means, there is provided no communication of the hydraulic oil between the both inlet and outlet ports, thus effecting the hydraulic pressure relieving or reducing function of a hydraulic pressure control valve, while when the piston is caused to move toward the outlet port side under the effect of a hydraulic pressure working on the opposite end of the piston which overcomes the urging force of the biasing means, there is provided communication between the both ports through the cylinder portion, thus releasing or cancelling the effect of pressure relieving function of the control valve.

The nature, principle, and details of the present invention, as well as further objects and advantages thereof, will become more apparent from the following detailed description with respect to a preferred embodiment of the invention, when read in conjunction with the accompanying drawings, in which like parts are designated with like reference numerals.

DETAILED DESCRIPTION OF THE PREFERRED EMBODIMENT

Description will now be given on preferred embodiments of a hydraulic pressure control valve incorporating a feature of releasing or cancelling operatively the hydraulic pressure relieving function thereof adaptive when required so to do according to this invention in conjunction with the accompanying drawing.

Figure 1:
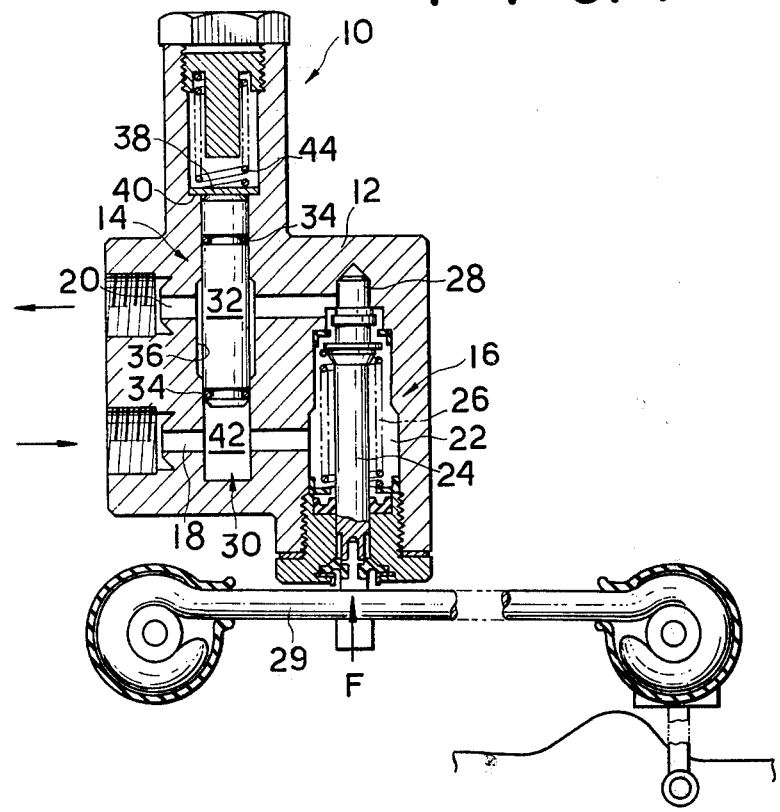
FIG. 1 is a vertical cross sectional view showing an embodiment of the hydraulic pressure control valve according to the present invention.

Referring now to FIG. 1, there is shown, by way of one embodiment, a hydraulic pressure control valve generally designated with the reference numeral 10 which comprises a casing 12, a bypass mechanism 14 and a hydraulic pressure relieving mechanism 16, both of which are included within the casing 12.

In this construction, the hydraulic pressure relieving mechanism 16 is of a generally known load-responsive type valve, which includes a cylindrical bore or chamber 22 communicating inlet and outlet ports 18,20 defined in the casing 12, a piston 24 in the cylindrical chamber 22, a coil spring 26 adapted to produce a biasing force to urge the piston 24 toward the side of the outlet port 20, and a valve 28 disposed at the area where the cylindrical chamber 22 and the outlet port 20 joints with each other and adapted, by function of the piston 24, to open and close the communication path therebetween. Against the end surface of the piston 24, there is effected an operating force F in reflection of the load of a vehicle through a load sensing spring 29 for detecting the load of the vehicle.

The inlet port 18 is operatively connected to the rear port side of a tandem-master cylinder (not shown), and the outlet port 20 is operatively connected to the rear wheel brake cylinders (not shown). With this connection, when the hydraulic pressure delivered from the tandem-master cylinder to the inlet port 18 is relatively low, it will, as generally accepted, be directed immediately, without any effect of relieving from the cylindrical chamber 22 to the respective rear wheel brake cylinders through the outlet port 20. In contrast, as the hydraulic pressure to be led into the inlet port 18 increases to a high level enough to cause the piston 24 to actuate the valve 28, the hydraulic pressure within the inlet port 18 is not immediately delivered into the outlet port 20 any longer, but is relieved with its pressure to an extent to actuate the piston 24 and relayed to the outlet port side, thus effecting a relieved hydraulic pressure upon the respective rear wheel brake cylinders. The hydraulic pressure within the inlet port 18, which is of an initial or starting point of relieved pressure, grows higher, as the operating force F developed according to the load of the vehicle immediately working on the piston 24 becomes greater.

The bypass mechanism 14 according to this invention comprises a cylindrical bore or cylinder portion 30 defined in a parallel relationship with respect to the cylindrical chamber 22 so as to extend across and connect operatively the both inlet and outlet ports 18, 20, and a piston 32 in the cylinder portion 30. This piston 32 is provided with annular seal rings 34 near the respective ends thereof and designed with an even or uniform diameter in cross section. There is defined an enlarged-diameter zone or portion 36 around the area of the cylinder portion 30 where it connects with the outlet port 20. With such arrangement, the increased inner diameter of the inside wall of the cylinder portion 30 defines an annular space communicating with the outlet port 20 between the inside wall surface of the cylinder portion 30 and the outer circumferential surface of the piston 32.

There is fixedly mounted a plate 38 upon one end of the piston 32 in such a manner that is may slidably be supported by a shoulder portion 40 defined in the cylinder portion 30. When the piston 32 is held in the lower position with the plate 38 sitting upon the shoulder portion 40, there is defined a space or chamber 42 which communicates with the inlet port 18 at the lower end of the piston 32 and which has no connection with the enlarged diameter portion 36. Upon the plate 38, one end of the coil spring 44 is positioned immediately so that it resiliently urges the piston 32 toward the inlet port side.

On the other hand, in the bypass mechanism 14 a hydraulic pressure introduced into the inlet port 18 incessantly works on the lower end of the piston 32, irrespective of the function of the pressure relieving mechanism 16, therefore effecting a biasing force upon the piston 32 so as to keep it urged in the upward direction as in FIG. 1 or toward the outlet port side. There is no hydraulic pressure working upon the piston 32 so as to bias it in the axial direction thereof on the part of the outlet port 20. From this, it is seen that the piston 32 is under the biasing force of the coil spring 44 at one end thereof to bias the piston in the downward direction as in FIG. 1, while there being the hydraulic pressure from the inlet port 18 working upon the other end of the piston to bias it in the upward direction. Consequently, the piston 32 is not caused to slidingly shift in the upward direction unless the hydraulic pressure working upon the piston overcomes the biasing force of the coil spring 44, thus providing no communication between the both ports 18,20 through the cylinder portion 30. In contrast, when the hydraulic pressure in the inlet port 18 grows higher to an extent that the pressure working upon the piston 32 overcomes the biasing force of the coil spring 44 the piston 32 is caused to be moved upwardly as in FIG. 1, and upon the upward shifting of the piston to the upper position within the cylinder portion 30, there is now opened a route for the hydraulic oil to communicate between the chamber 42 and the enlarged diameter portion 36. As a consequence, the inlet port 18 and the outlet port 20 are short-circuited or bypassed through the cylinder portion 30.

In this respect, by predetermining an appropriate biassing force of the coil spring 44, it is practicably possible to have a shortcircuit or bypass route between the both inlet and outlet ports 18,20 through the cylinder portion 30 only when the hydraulic pressure in the inlet port 18 grows and exceeds a predetermined level, irrespective of the operating condition of the pressure relieving mechanism 16. In practice, this effect of increasing the hydraulic pressure in the inlet port area may be realized by stongly stepping down on the foot brake pedal of the brake system by the driver of a vehicle, and this operation is particularly required when there is accidental damage or leakage of the hydraulic oil in the front brake line, for releasing or cancelling the hydraulic pressure relieving function of the mechanism 16 on the part of the rear brake line. This enables a relatively high pressure to be relayed through the outlet port 20 to the rear wheel brake cylinders so as to attain an efficient braking effect on the rear wheels of the vehicle.

Figure 2:
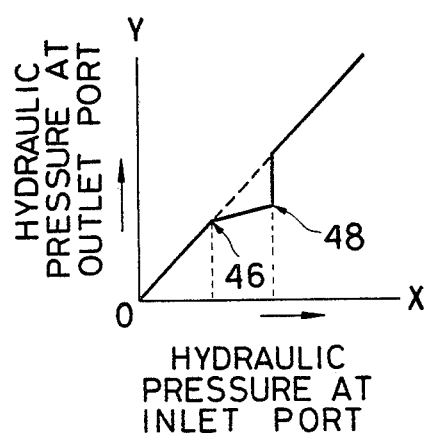
FIG. 2 is a graphic representation showing the performance characteristics of the control valve as shown in FIG. 1.

In the example shown in FIG. 1, as fully discussed hereinbefore, there is no hydraulic pressure working from the outlet port 20 upon the piston 32 along the axial direction thereof. Consequently, when there is produced a pressure rise in the inlet port 18, the balance between the hydraulic pressure on the part of the inlet 18 and the biasing force of the coil spring 44 is lost immediately, to cause the piston 32 to be shifted upwardly in FIG. 1 and give a shortcircuit or bypass route between the inlet and outlet ports 18,20, thus introducing the hydraulic pressure in the inlet port 18 into the outlet port 20. As a consequence, it is seen from the graphic representation of FIG. 2 that when the pressure relieving function of the mechanism 16 is cancelled, there is attained quickly a sharp rise of the hydraulic pressure in the rear wheel brake cylinders. In the coordinates shown in FIG. 2, the abscissa X represents the hydraulic pressure in the inlet port 18 and the ordinate Y is that in the outlet port 20, and the points 46 and 48 show pressure relieving and cancelling moments on the pressure control valve 10, respectively.

Figure 3:
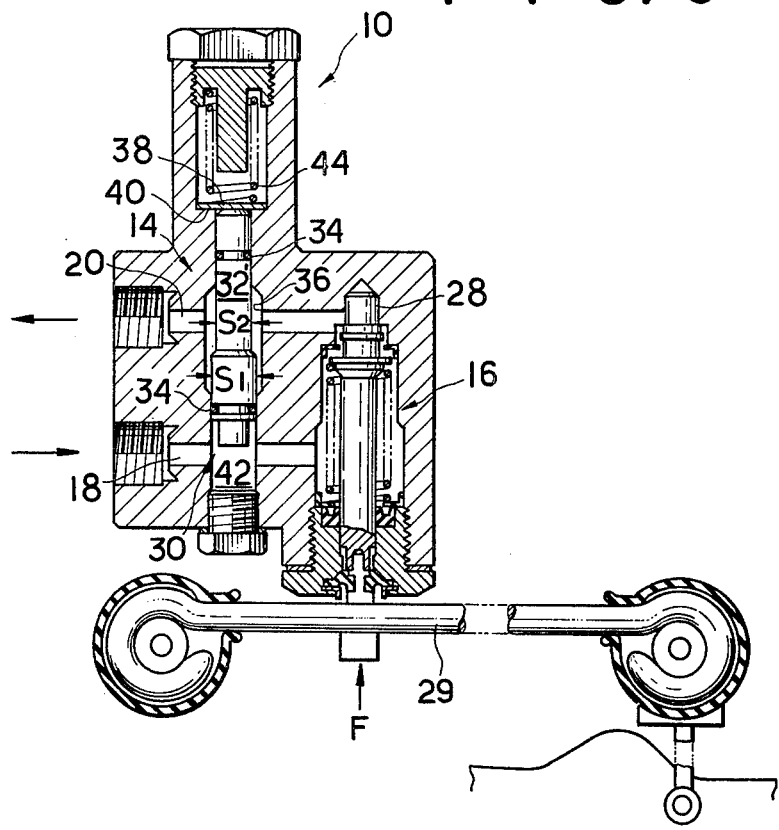
FIG. 3 is a similar view to FIG. 1, showing another embodiment of the present invention.
Figure 4:
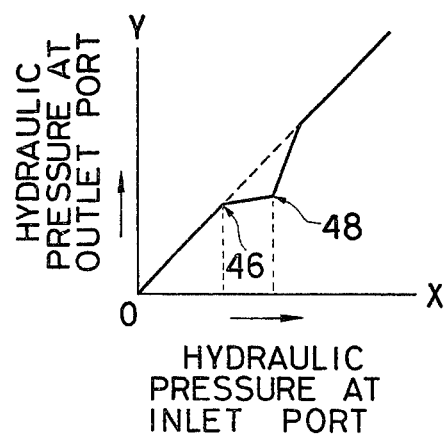
FIG. 4 is a graphic representation showing the performance characteristics of the control valve as shown in FIG. 3.

Referring now to FIG. 3 showing the other embodiment of the hydraulic pressure valve according to this invention, the piston 32' is provided at one end of the inlet port side with a portion having a cross-sectional area $S_1$ and at the other end on the outlet port side with a reduced portion having a cross-sectional area $S_2$. With this arrangement, a minor hydraulic pressure which is proportional to differential cross-sectional area $(S_1 - S_2)$ may be effected upon the piston 32'. In this construction, since the hydraulic pressure working on the piston 32' on the outlet port side increases in proportion as that in the inlet port 18 increases, a balance existing between the hydraulic pressure in the outlet port 20 effecting to urge the piston 32' downwardly and the biasing force of the coil spring 44 effecting to urge it upwardly is not lost so quickly in comparison with the construction as shown in FIG. 1. Consequently, when the pressure relieving function of the mechanism 16 is cancelled, the hydraulic pressure in the outlet port 20 increases relatively gently, as seen from the graphic representation in FIG. 4 which similar to FIG. 2. This feature of relatively gentle response in the hydraulic pressure resumption as attainable from the construction shown in FIG. 3 is preferred in the respect of a smooth and comfortable braking effect.

Also, this slow effect of cancelling the hydraulic pressure relieving function is preferable from the viewpoint of a brake pedal release operation. That is, according to the effect of the pressure relieving mechanism 16 of the conventional construction as included in FIGS. 1 and 3, even when the brake pedal is released completely, it is impossible to attain a quick hydraulic pressure drop in the outlet port along the theoretically idealistic curve. For attaining a quick hydraulic pressure drop in the outlet port as desired, it is proposed to substantially increase an effective volume of the hydraulic oil path, which is defined by the outlet port itself at the moment of releasing of the brake pedal.

However, with the construction of the piston 32 in the bypass mechanism as shown in FIG. 1 wherein it has a uniform diameter along its longitudinal axis, and therefore, when releasing the brake pedal and the piston 32 is shifted to the inlet port side by the biasing force of the coil spring 44, there is produced no change in the effective volume of the hydraulic oil path in the outlet port.

In contrast, in the case of the piston 32' as shown in FIG. 3, there is provided a thinner or reduced diameter portion (having diameter's cross-sectional area $S_2$) on the outlet port side. With this piston profile, when the piston 32' is shifted to the inlet port side by the biasing force of the spring 44, there is provided a substantial increase in the effective volume of the hydraulic oil path on the outlet port side to an extent proportional to the differential cross-sectional area $(S_1 - S_2)$ of the piston 32'. Consequently, when releasing the brake pedal, it is now possible practicably to effect a quick hydraulic pressure drop in the outlet port according to the theoretically idealistic pressure drop curve.

In the foregoing description, although there were shown the examples wherein the hydraulic pressure relieving mechanism is of a load-responsive valve type, it is apparent to those skilled in the art that it is possible to apply various hydraulic pressure relieving mechanisms in place of such load-responsive valve.

According to one of the advantageous features attained from the present invention, as mentioned hereinbefore, the bypass mechanism incorporated in the pressure relieving valve requires no supply of the hydraulic pressure from the front hydraulic line, thus eliminating the hydraulic connection or piping therefor. In addition, the entire system may turn out to be simple in its construction in comparison with the conventional construction, yet it is so efficient and reliable in operation enough to provide a positive and smooth braking effect in an emergency.

What is claimed is:

1. In a hydraulic pressure control valve for use in a hydraulic brake system having a casing in which there are provided an inlet port operatively connected to a master cylinder, an outlet port operatively connected to a plurality of wheel brake cylinders and a hydraulic pressure relieving mechanism adapted to relieve a hydraulic pressure from said master cylinder at a predetermined rate, the improvement wherein said control valve is provided with a bypass mechanism which comprises a cylinder defined in said casing and operatively communicating with said hydraulic pressure relieving mechanism and said inlet and outlet ports, a piston slidably fitted in said cylinder, said piston having one end subject to atmospheric pressure and an opposite end subject to hydraulic pressure from said inlet port, and biasing means adapted to urge said piston toward the inlet port side, and which are adapted to communicate said inlet and outlet ports upon the shifting motion of said piston toward the outlet port side due to a hydraulic pressure rise on said inlet port side which is sufficient to overcome the biasing force of the biasing means.

2. The improvement as claimed in claim 1 wherein said inlet and outlet ports are defined in parallel with each other in said casing and said cylinder extends at generally right angles with said inlet and outlet port.

3. The improvement as claimed in claim 1 wherein said piston has a uniform outer diameter, said cylinder is defined with an enlarged diameter portion at and about the junction of itself and said outlet port, whereby said hydraulic pressure relieving mechanism is bypassed through said enlarged diameter portion upon the shifting motion of said piston toward said outlet port side.

4. In a hydraulic pressure control valve for use in a hydraulic brake system having a casing wherein there are provided an inlet port operatively connected to a master cylinder, an outlet port operatively connected to a plurality of wheel brake cylinders and a hydraulic pressure relieving mechanism adapted to relieve a hydraulic pressure from said master cylinder at a predetermined rate, the improvement wherein said control valve is provided with a bypass mechanism which comprises a cylinder defined in said casing and operatively communicating with said hydraulic pressure relieving mechanism and said inlet and outlet ports, a piston slidably fitted in said cylinder and adapted to open and close said inlet and outlet ports, and biasing means adapted to urge said piston, said inlet and outlet ports extending generally in parallel with each other, said cylinder being defined generally at right angles with said ports, said piston having one end subject to atmospheric pressure, said cylinder having an enlarged diameter portion near and at the junction between itself and said outlet port, said piston having a uniform diameter along the longitudinal axis thereof, said biasing means urging said piston toward the inlet port side with such an extent of biasing force that said piston may be shifted toward said outlet port side by an increased hydraulic pressure in said inlet port overcoming the biasing force of said biasing means, whereupon said pressure relieving mechanism can be bypassed with said hydraulic pressure introduced through said enlarged-diameter portion of said cylinder, thereby releasing or cancelling the hydraulic pressure relieving function of said control valve.

5. In a hydraulic pressure control valve for use in a hydraulic brake system having a casing where there are provided an inlet port operatively connected to a master cylinder, an outlet port operatively connected to a plurality of wheel brake cylinders and a hydraulic pressure relieving mechanism adapted to relieve a hydraulic pressure from said master cylinder at a predetermined rate, the improvement wherein said control valve is provided with a bypass mechanism which comprises a cylinder defined in said casing and operatively communicating with said hydraulic pressure relieving mechanism and said inlet and outlet ports, a piston slidably fitted in said cylinder and adapted to open and close said inlet and outlet ports, and biasing means adapted to urge said piston, said both inlet and outlet ports generally in parallel with each other, said cylinder being defined generally at right angles with said ports and having an enlarged-diameter portion near and at the junction between itself and said outlet port, said piston having one end subject to atmospheric pressure, said piston having a reduced diameter portion along an area thereof to meet with said outlet port, whereby there is introduced a minor hydraulic pressure working upon said piston from said outlet port side so as to partly counteract the hydraulic pressure from the inlet port side, said biasing means urging said piston toward the inlet port side with such an extent of biasing force that said piston may be shifted toward said outlet port side by an increased hydraulic pressure in said inlet port overcoming the biasing force of said biasing means, whereupon said pressure relieving mechanism can be bypassed with said hydraulic pressure introduced through said enlarged-diameter portion of said piston cylinder, thereby releasing or cancelling the hydraulic pressure relieving function of said control valve.

6. In a hydraulic pressure control valve for use in a hydraulic brake system having a casing in which there are provided an inlet port operatively connected to a master cylinder, an outlet port operatively connected to a plurality of wheel brake cylinders and a hydraulic pressure relieving mechanism adapted to relieve a hydraulic pressure from said master cylinder at a predetermined rate, the improvement wherein said control valve is provided with a bypass mechanism which comprises a cylinder defined in said casing and operatively communicating with said hydraulic pressure relieving mechanism and said inlet and outlet ports, a piston slidably fitted in said cylinder, said piston having one end subject to atmospheric pressure and an opposite end subject to hydraulic pressure from said inlet port, and biasing means adapted to urge said piston toward the inlet port side, and which are adapted to communicate said inlet and outlet ports upon the shifting motion of said piston toward the outlet port side due to a hydraulic pressure rise on said inlet port side, said piston having a reduced diameter portion along an area thereof to meet with said outlet port whereby a minor hydraulic pressure works upon said piston from said outlet port side to partially counteract the hydraulic pressure from the inlet port side.

7. In a hydraulic pressure control valve for use in a hydraulic brake system having a casing wherein there are provided an inlet port operatively connected to a master cylinder, an outlet port operatively connected to a plurality of wheel brake cylinders and a hydraulic pressure relieving mechanism adapted to relieve a hydraulic pressure from said master cylinder at a predetermined rate, the improvement wherein said control valve is provided with a bypass mechanism which comprises a cylinder defined in said casing and operatively communicating with said hydraulic pressure relieving mechanism and said inlet and outlet ports, a piston slidably fitted in said cylinder and adapted to open and close said inlet and outlet ports, and biasing means adapted to urge said piston toward said inlet port with such a biasing force that said piston may be shifted toward the outlet port due a hydraulic pressure rise on the inlet port side, means for establishing communication between said inlet and outlet ports upon the shifting motion of said piston toward the outlet port side, said biasing means adapted to operate independently of load such that the pressure relieving point at which said pressure relieving mechanism begins to operate may be fixed regardless of the increasing or decreasing of the load.

* * * * *